United States Patent [19]

Wellman et al.

[11] 4,187,194

[45] Feb. 5, 1980

[54] ENCAPSULATION PROCESS

[75] Inventors: Russel E. Wellman, Pittsford; Robert W. Brown, Rochester, both of N.Y.

[73] Assignee: Xerox Corporation, Stamford, Conn.

[21] Appl. No.: 440,637

[22] Filed: Feb. 7, 1974

Related U.S. Application Data

[63] Continuation-in-part of Ser. No. 214,744, Jan. 3, 1972, abandoned.

[51] Int. Cl.² .................. B01J 13/02; B05D 7/00; B29C 13/00
[52] U.S. Cl. .................. 252/316; 71/64 F; 106/308 M; 264/4; 424/33; 427/221; 427/222
[58] Field of Search .................. 252/316, 62.1 P; 117/100 A; 424/33; 264/4; 106/308 M; 427/221, 222

[56] References Cited

U.S. PATENT DOCUMENTS

| | | | |
|---|---|---|---|
| 3,016,308 | 1/1962 | Macaulay | 252/316 X |
| 3,338,991 | 8/1967 | Insalaco et al. | 117/100 A |
| 3,455,838 | 7/1969 | Marotta et al. | 252/316 |
| 3,561,003 | 2/1971 | Lanham et al. | 106/22 |

*Primary Examiner*—Richard D. Lovering
*Attorney, Agent, or Firm*—Ernest F. Chapman

[57] ABSTRACT

A process for forming capsules comprising:
  (i) forming a solution of wall material and core material in a solvent;
  (ii) admixing said solution with an immiscible liquid to form a dispersion wherein said solution is the dispersed phase and the immiscible liquid is the continuous phase;
  (iii) altering the solubility characteristics of the solvent for said solution to effect sequential phase separation of said core and wall materials, respectively, thereby forming capsules of core material encapsulated with wall material; and
  (iv) recovering said capsules.

18 Claims, 2 Drawing Figures

ENCAPSULATION PROCESS

CROSS REFERENCE TO RELATED APPLICATION

This application is a continuation-in-part of United States application Ser. No. 214,744 filed Jan. 3, 1972, and now abandoned.

This invention relates to encapsulation processes. More particularly, this invention relates to encapsulation of a core of solid or liquid material within a protective wall by phase separation of one or both of said core and wall materials from a solvent.

Many different techniques have been developed for encapsulating solid or liquid materials. Generally, these techniques can be regarded as involving the following four basic steps:

(1) forming a dispersion of a core material in a medium containing the wall or encapsulating material;
(2) depositing the wall material upon the surface of the core material to form capsules;
(3) hardening of the capsules to prevent their agglomeration; and
(4) recovering the capsules.

The continuous phase or medium in step (1) is normally a solution of the wall material. If the core is liquid, it is dispersed or emulsified in the solution; if, however, the core is solid, it is usually pre-ground to the desired size and then dispersed within the solution. Step (2) generally involves changing the conditions in such a way as to cause phase separation of the wall material from the continuous wall solution phase. Normally, the wall material is caused to phase separate as a coherent liquid film around the particles or droplets of the core phase. This liquid or gelatinous wall phase must be hardened (step (3)), before recovery of the capsules, if the desired product is individual capsules, i.e., a dry powder. Capsule recovery can be effected by filtering, centrifuging and the like, followed by drying. In some instances, the dried product is a caked powder and must be reduced to a free flowing powder by a gentle grinding operation, e.g., sieving.

Two primary and related problems in existing encapsulation processes have been control of particle size and prevention of agglomeration. Particle size is generally established in step (1) or in step (2); it is controlled primarily by varying the type and degree of agitation and also, by use of surfactants and thickeners to modify the interfacial tension and viscosities. Agglomeration of the core material (during step 2) or of the capsules (during steps 2 or 3) is controlled in the same way as particle size. Experience has shown, however, that conditions which give the desired particle size are not necessarily those suitable for preventing agglomeration later in the process.

Accordingly, it is an object of the present invention to provide an encapsulation process which overcomes the above-identified deficiencies of other prior processes.

It is another object to provide an encapsulation process which has application to a wide variety of liquid phase encapsulations without regard to the manner in which phase separation of the wall material is effected.

It is still another object of the present invention to provide an encapsulation process which affords convenient control over particle size.

It is a further object of the present invention to provide an encapsulation process which prevents the occurrence of agglomeration.

It is a still further object of the present invention to provide an encapsulation process which enables the preparation of toner particles suitable for electrostatographic applications.

These as well as other objects are accomplished by the present invention which provides a process for forming capsules comprising:

(i) forming a solution of wall material and core material in a solvent;
(ii) admixing said solution with an immiscible liquid to form a dispersion wherein said solution is the dispersed phase and said immiscible liquid is the continuous phase;
(iii) altering the solubility characteristics of the solvent for said solution to effect sequential phase separation of said core and wall materials, respectively, thereby forming capsules of core material encapsulated with wall material; and
(iv) recovering said capsules.

Employing the process of the present invention, dispersion or emulsification of the solution of core and wall materials in an immiscible fluid substantially reduces or eliminates the chances of agglomeration occurring during deposition and hardening of the wall. Moreover, the emulsification process aids significantly in obtaining control over particle size. In the absence of agglomeration, the particle size of the dispersed globules establishes the maximum particle size of the capsules since phase separation occurs within the individual dispersed globules. The particle size of the dispersed globules can be easily regulated by varying the type and degree of agitation and/or by the use of surfactants and thickeners to modify the interfacial tensions and viscosities.

The capsules prepared in accordance with the present invention are especially useful as toner compositions for developer systems employed in electrostatography. For purposes of illustration, this invention will be further described in relation to the preparation of these toner compositions; however, as described hereinbelow, the present invention has broad application.

Electrostatography is perhaps best exemplified by the process of xerography as described in U.S. Pat. No. 2,297,691 to C. F. Carlson. In this process, a photoconductor is first given a uniform electrostatic charge over its surface and is then exposed to an image of activating electromagnetic radiation which selectively dissipates the charge in illuminated areas of the photoconductor while charge in the non-illuminated areas is retained thereby forming a latent electrostatic image. This latent electrostatic image is then developed or made visible by the deposition of finely divided, electroscopic marking material, referred to in the art as "toner" on the surface of the photoconductor, which marking material conforms to the pattern of the latent electrostatic image. The visible image may then be utilized in a number of diverse ways. For example, the image may be viewed in situ on the photoconductive insulator, fixed in place on the photoconductive insulator or transferred to a second surface such as a sheet of paper and fixed in place thereon as desired depending upon whether the photoconductive insulating material is reusable as is the case with amorphous selenium photoconductive insulators or non-reusable as is the case with particulate zinc oxide-binder film type xerographic plates.

Although the Carlson patent describes developing the latent electrostatic image by dusting it with various powders such as lycopodium, gum copal, cumarone-indene resin, various powdered dyes and the like, many other developing materials and techniques have been devised since that time. Some of the development techniques include brush development as described in U.S. Pat. No. 3,015,305 to Hall, powder cloud development as described in U.S. Pat. No. 2,918,900 to Carlson, liquid spray development as described in U.S. Pat. No. 2,551,582 to Carlson, immersion development as described in U.S. Pat. No. 3,010,842 to Ricker, loop development as described in U.S. Pat. No. 2,761,416 to Carlson and doner development as described in U.S. Pat. No. 2,895,847 to Mayo. However, it is more than likely that the commercial xerographic development technique most widely used today is the technique known as cascade development which is described in U.S. Pat. No. 2,618,552, to Wise. This development technique is carried out by rolling or cascading across the latent electrostatic image bearing surface, a developing mixture composed of relatively large carrier particles, each having a multiplicity of electrostatically adhering fine marking particles, known as toner particles, on its surface. As this mixture cascades or rolls across the image bearing surface, the toner particles are electrostatically deposited on the charged portions of the image and not on the uncharged background areas of the image. In addition, toner particles accidently falling on these non-image areas are physically removed therefrom by the electrostatic attraction of carrier particles which pass in close proximity to these unbound toner particles. The result of this development process is an excellent background-free copy of the electrostatic image made up of the toner particles electrostatically clinging to the image surface. As a general rule when any one of these development processes is used with a reusable electrostatographic plate, such as an amorphous selenium plate, the toner particle image is transferred to and fixed on a second layer such as a paper sheet in contact with the toner image as described in U.S. Pat. No. 2,576,047 to Schaffert. After the image is transferred from the surface of the amorphous selenium plate, the plate surface may be cleaned and it is then ready for reuse in a subsequent cycle. The toner resins are usually thermoplastics selected to have glass transition temperatures significantly above any ambient temperatures which might be encountered (generally running above 130° F.) and these are fixed to the paper in most cases by radiant heat fusing.

Most other electrostatographic techniques use the above-described or similar development methods employing the same type of marking material or toner, and differ only in the mode of forming the latent electrostatic charge pattern which is developed. (See, for example, U.S. Pat. Nos. 2,576,047 to Schaffert and 3,064,259 to Schwertz.) In another technique, for example, in U.S. Pat. No. 3,081,698 to Childress, a conductive screen with a plurality of apertures which define the image area to be reproduced is spaced opposite a conductive backing electrode and a potential is applied between this backing electrode and the screen such that when finely divided electrostatographic toner particles smaller than the apertures in the screen are applied to the surface of the screen opposite the backing electrode, the electrostatic field set up by the potential source causes the particles to move through the apertures in the screen to form a toner image on the blocking electrode in the configuration of the apertures on the screen. Various surfaces may be interposed between the screen and the backing electrode so that the particle image may be intercepted and formed on such interposed surfaces. Regardless of the surface upon which the toner image is deposited, it may be fixed in place upon that surface or transferred to another surface and fixed thereon.

The common feature of all of these electrostatographic systems is that they employ the lines of force from an electric field to control the deposition of finely divided, marking material or toner on a surface, thus forming an image with the toner particles.

In addition to the developing powder or toner materials described in the original Carlson patent, a number of other toner materials have been developed which are especially valuable for use in the newer development techniques including the cascade technique described immediately above. Generally speaking, these new toner materials have comprised various improved resins mixed with different pigments such as carbon black. Some exemplary patents along this line include U.S. Pat. No. 2,659,670 to Copley which describes a toner resin of rosin-modified phenol-formaldehyde, U.S. Pat. No. Re. 25,136 to Carlson which describes a toner employing a resin of styrene polymers and copolymers and U.S. Pat. No. 3,079,342 to Insalaco describing a plasticized styrene-methacrylate copolymer resin.

In the past, these toners have generally been prepared by thoroughly mixing the softened resin and pigment to form a uniform dispersion as by blending these ingredients in a rubber mill or the like and then pulverizing this material to form it into small particles. Most frequently, this division of the resin-pigment dispersion has been made by jet pulverization of the material. Although this technique of toner manufacture has produced some very excellent toners, it does tend to have certain shortcomings. For example, it generally produces a rather wide range of particle sizes in the toner particles. Although the average particle size of toner made according to this technique generally ranges between about 10 and about 15 microns, individual particles ranging from sub micron in size to above 30 microns are not infrequently produced. Furthermore, this is a batch process which tends to be slow, expensive, noisy and dusty. In addition, this technique of toner production imposes certain limitations upon the material selected for the toner because the resin-pigment dispersion must be sufficiently friable so that it can be pulverized at an economically feasible rate of production. The problem which arises from this requirement is that when the resin-pigment dispersion is sufficiently friable for really high speed pulverizing, it tends to form an even wider range of particle sizes during pulverization including relatively large percentages of fines. In addition, such highly friable materials are frequently subject to further pulverization or powdering when they are employed for developing in electrostatographic copying apparatus. All other requirements of electrostatographic developers or toners including the requirements that they be stable in storage, nonagglomerative, have the proper triboelectric properties for developing, form good images, do not film or soil the selenium plate and have a low melting point for heat fusing are only compounded by the additional requirements imposed by this toner forming process.

One advantage of the present invention is that it provides a process which will directly produce a colored particle in a range of particle sizes from 1 to 100 microns useful in electrostatographic reproduction systems and which avoids the many cumbersome operational sequences heretofore required.

Additionally, the present process enables low-melting resins to be employed as the major constituent of the toner and also provides a means for hardening the surface thereof.

Any suitable liquid or solid material soluble in the same solvent or mixture of solvents as the wall material can be employed as the core material for the encapsulated product of the process of this invention. Typical liquid core materials include water, oils, low molecular weight polymers such as polyesters (e.g., Co-Rezyn 3, available from Interplastic Corporation), polyester based urethane polymers (e.g., Formrez P-910, available from Witco Chemical Corporation), epoxidized bisphenol A acrylate (e.g., Epocryl U-12, available from Shell Chemical Company), the reaction product of dimerized linoleic acid with diamines or polyamines (e.g., Versamid 115 and 140 available from General Mills Chemical Division), polyamides (e.g., Polyamide 315, 235 and 340, available from Union Carbide Corporation), polybutadiene (e.g., Poly B-D, a hydroxy terminated polybutadiene liquid resin available from Sinclair Petrochemicals, Incorporated), silicone gums (e.g., W 981 from Union Carbide), copolyesters and phthalic acid and an alkyl dicarboxylic acid condensed with an alkyl diol (e.g., Santicizers 405 and 411, available from Monsanto Chemical Company), and mixtures thereof. Typical semi-solid core materials include polyesters (e.g., Epon 872, available from Shell Chemical Company), polyester based urethane polymers (e.g., Formrez P-314, P-211 and MG-4 available from Witco Chemical Corporation), epoxidized phenolformaldehyde resin (e.g., Epoxy-Novalak ERLB-0449, available from Union Carbide Corporation), polyisobutylene (e.g., Oppanol B-10, available from Badische Anilin & Soda Fabrik, West Germany), the reaction product of dimerized linoleic acid with diamines or polyamines (e.g., Versamid 100, available from General Mills Chemical Division), and mixtures thereof. Typical solid core materials include polyurethane elastomers (e.g., Estane 5701, 5702, 5710, and 5714 available from B. F. Goodrich Company), polyester based alkyd resins, polyester based urethane polymers (e.g., Formrez P-410, P-610, and L10-72, available from Witco Chemical Corporation), polyamides such as the reaction products of dimerized linoleic acid with diamines or polyamines (e.g., Versamides 712, 948, and 950, available from General Mills Chemical Division), the reaction products of dimer acids with linear diamines (e.g., Emerez 1530, 1538 and 1540, available from Emery Industries, Incorporated), ester gums such as rosin esters and modified rosin esters, polyvinylacetate, the polymeric reaction product of isopropylindenediphenoxypropanol and adipic acid, the polymeric reaction product of isopropylidenediphenoxypropanol and sebacic acid, $C_{36}$ diurea, polyacetaldehyde, styrene butadiene block copolymers (e.g., Kraton 4113, available from Shell Chemical Company), and mixtures thereof. When a single core encapsulated product is sought, core materials having higher surface tension properties than the wall materials should be employed.

Any suitable material soluble in the same solvent or mixture of solvents as the core material can be employed as the wall material for the encapsulated product of the process of this invention. The wall material can be a homopolymer, a copolymer of two or more monomers or a terpolymer. Typical wall materials include polystyrenes (e.g., PS-2, Styron 666 and 678 available from Dow Chemical Company; Lustrex 99, available from Monsanto Chemical Company), styrene-methacrylate and styrene-acrylate and styrene-acrylate copolymers, polycarbonates (e.g., Lexan 101, a poly-(4,4'-dioxydiphenyl-2,2'-propane carbonate) available from General Electric Company), polyethers, low molecular weight polyethylenes, polyesters such as polymeric acrylic and methacrylic esters, fumarate polyester resins (e.g., Atlac Bisphenol A, available from Atlas Chemical Company), Dion-Iso polyester resins available from Diamond Shamrock Chemical Company, Krumbhaar polyester resins (e.g., K-2200 and K-1979, available from Lawter Chemicals, Incorporated), polyamides such as the reaction product from terephthalic acid and alkyl substituted hexamethylene diamine (e.g., Trogamid T, available from Dynamit Nobel Sales Corporation), the reaction products of dimerized linoleic acid with diamines or polyamines (e.g., Versamid 712, 948, and 950, available from General Mills Chemical Division), the reaction products of dimer acids with linear diamines (e.g., Emerez 1530, 1538, 1540, and 1580 available from Emery Industries, Incorporated), naturally occurring materials such as gelatin, zein, gum arabic and the like, and mixtures thereof.

Basically, any organic polymer including homopolymers and copolymers can be suitably employed as either the core or wall material in the present invention. The selection of a particular polymer for either the wall or core material is dictated by the properties desired in the ultimate encapsulated product. Thus, for example, polymers made from monomers having the characteristic vinyl $>C=C<$ structure can be employed. Illustrative of such polymers are those whose repeating units comprise esters of saturated alcohols with mono and polybasic unsaturated acids such as alkyl acrylates and methacrylates, haloacrylates, diethyl maleate, and mixtures thereof; vinyl and vinylidene halides such as vinyl chloride, vinyl fluoride, vinylidene chloride, vinylidene fluoride, tetrafluoroethylene, chlorotrifluoroethylene and mixtures thereof; vinyl esters such as vinyl acetate, unsaturated aromatics such as styrene and various alkyl styrenes, alphamethyl styrene parachlorostyrene, parabromostyrene, 2,4-dichlorostyrene, vinyl naphthalene, paramethoxystyrene and mixtures thereof; unsaturated amides such as acrylamide, methacrylamide and mixtures thereof; unsaturated nitriles such as acrylonitrile, methacrylonitrile, haloacrylonitrile, phenylacrylonitrile, vinylidene cyanide, and mixtures thereof; N-substituted unsaturated amides such as N,N-dimethyl acrylamide, N-methyl acrylamide and mixtures thereof; conjugated butadienes such as butadiene, isoprene and mixtures thereof; unsaturated ethers such as divinyl ether, diallyl ether, vinyl alkyl ether and mixtures thereof; unsaturated ketones such as divinyl ketone, vinyl alkyl ketone and mixtures thereof; unsaturated aldehydes and acetals such as acrolein and its acetals, methacrolein and its acetals, and mixtures thereof; unsaturated heterocyclic compounds such as vinyl pyridine, vinyl furan, vinyl-coumarone, N-vinyl carbazole, and mixtures thereof; unsaturated alicyclic compounds such as vinylcyclopentane, vinyl-cyclohexane and mixtures thereof; unsaturated thio compounds such as vinyl thioethers; unsaturated hydrocarbons such as ethylene, propylene, coumarone, indene, terpene, polymerizable hydrocarbon fractions, isobutylene and mixtures thereof; alkyl compounds such as alkyl alcohol, allyl esters, diallyl phthalate, triallylcyanurate and mixtures thereof.

Whether a particular polymer is employed as a core or wall material will depend upon the ultimate characteristics desired in the toner particles. For example, in high speed electrostatographic processes, it is often desirable to employ toner particles which are low melting, yet have sufficient surface hardness to enable the toner particles to withstand the rigors of the electrostatographic process. In such instances, for example, a toner comprised of a low melting poly(n-butylmethacrylate) core encapsulated with polystyrene would be highly desirable.

In the preparation of electrostatographic toners, wall material resins containing a relatively high percentage of a styrene resin are preferred because better image quality is achieved. The styrene resin may be a homopolymer of styrene or styrene homologues or copolymers of styrene with other monomers containing a single methylene group attached to a carbon atom by a double bond. Thus, typical monomeric materials which may be copolymerized with styrene by addition polymerization include: p-chlorostyrene; vinyl naphthalene; ethylenically unsaturated mono-olefins such as ethylene, propylene, butylene, isobutylene and the like; vinyl esters such as vinyl acetate, vinyl propionate, vinyl benzoate, vinyl butyrate and the like; esters of alphamethylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methyl-alphachloracrylate, methyl methacrylate, ethyl methacrylate, butyl methacrylate and the like; acrylonitrile, methacrylonitrile, acrylamide, vinyl ethers such as vinyl methyl ether vinyl isobutyl ether, vinyl ethyl ether, and the like; vinyl ketones such as vinyl methyl ketone, vinyl hexyl ketone, methyl isopropenyl ketone and the like; vinylidene halides such as vinylidene chloride, vinylidene chlorofluoride and the like; and N-vinyl compounds such as N-vinyl pyrrole, N-vinyl carbazole, N-vinyl indole, N-vinyl pyrrolidene and the like; and mixtures thereof. The styrene resins may also be formed by the polymerization of mixtures of two or more of these unsaturated monomeric materials with a styrene monomer.

For an electrostatographic toner, the wall material of the encapsulated toner should have a blocking temperature of at least about 100° F. When the encapsulated toner is characterized by a blocking temperature less than about 100° F., the toner particles tend to agglomerate during storage and machine operation and also form undesirable films on the surface of reusable photoreceptors which adversely affect image quality.

The determination of whether a particular polymer is ultimately the core or wall material is primarily dictated by the solubility characteristics of the solvent employed for either one or both of the core and wall materials. The solubility characteristics of the solvent can be altered by changes in temperature or concentration or by addition of one or more liquids which are miscible with the solvent and are non-solvents for either or both the core and wall materials. In the instance wherein the liquid is a non-solvent for both the core and wall materials, it generally is selected to effect phase separation of the core at lower concentrations of non-solvent than are required to effect phase separation of the wall. Similarly, when temperature or concentration changes are relied upon to effect phase separation, the solvent employed must be differentially sensitive either with respect to temperature or concentration to effect phase separation of the core before such separation of the wall.

Several methods for effecting phase separation within the dispersed phase of the dispersions or emulsions obtained in accordance with the present invention can be suitably employed. For example, in an instance wherein the core and wall materials are dissolved in at least one relatively volatile solvent, the solution can be emulsified in an immiscible liquid thereby forming individual droplets of the solution. As the solvent is removed by evaporation, the concentration of the core and wall materials is progressively increased whereby substantially all of the core material preferentially phase separates as a solvent poor phase. As the remaining solvent is removed from each droplet, the wall material is deposited about the core material to form small, spherical particles comprising the core material encapsulated with the wall material. Once the solvent is completely removed, the capsules are obtained in admixture with the immiscible liquid and can be easily recovered as, for example, by filtration. In this instance, as the concentration of the dissolved materials increases, the single phase system becomes increasingly unstable with respect to a two phase system comprised of a solvent poor core phase and a solvent rich wall phase. After phase separation occurs, the wall phase becomes more concentrated as solvent is removed and the wall becomes hardened without formation of a third (solvent) phase. However, if a mixture of solvents is used, the wall material may sequentially phase separate with formation of a third (solvent) phase. Formation of a third phase is not necessary but is not detrimental to the encapsulation process.

Alternatively, a solution of core and wall material in a common solvent can be emulsified, and the core phase separated by addition (and emulsification) of a non-solvent for the core. Thereafter, the wall material can be phase separated by vaporization of the solvent (either by heating or vacuum) as described above. In still another embodiment, a solution of core and wall material in a common solvent can be emulsified together with a concentration-dependent non-solvent for the core and wall which is less volatile than the solvent and miscible therewith. Upon vaporization of the solvent, the non-solvent becomes more concentrated effecting sequential phase separation of the core and then the wall material. Thereafter, the non-solvent can be removed by vaporization. In a further embodiment, an insoluble core material can be dispersed in a solution of wall material and the resulting dispersion can be emulsified in an immiscible liquid. The wall material can then be caused to phase separate by either removal of the solvent by vaporization or by addition of a non-solvent for the wall material. It is considered desirable, although not necessary, that the solvent and non-solvent be slightly soluble in the continuous phase of the emulsion.

Basically, this invention comprises the formation of an emulsion wherein the dispersed phase comprises a solution of core material in a solution of wall material and removal of the solvent from the dispersed phase to effect sequential phase separation. The core and wall materials and solvents are selected so that the change in concentration of solvent or solvents and dissolved materials during solvent removal or upon addition of a non-solvent or in some cases a change in temperature of the dispersed solution, will cause the core material to phase separate as a solvent poor, high surface tension phase in a solution of wall material. The solution of wall material will thereafter surround and encapsulate the core phase and ultimately form a substantially solid capsule shell upon evaporation of the solvent. The separated core material phase and the separated wall material phase can be solvent poor phases and not solvent free phases. The thus produced encapsulated product can be collected in dry, free flowing form by any conventional or suitable means.

The desired core and wall materials can be selected first on the basis of desired capsule properties. The solvent or mixture of solvents can then be selected to give the desired encapsulation. This selection is made on the basis of core and wall material solubility and solvent volatility. After the desired core and wall materials have been selected, initial experiments may be run to determine the general solubility characteristics of the materials. Once these general characteristics have been established, potential solvent combinations are selected and investigated in greater detail by determining solvent ratios at the cloud point. In the simpler cases, the preliminary experiments are sufficient to permit selection of a suitable solvent system. However, the procedure used for these simple cases is best understood if viewed as a simplified version of the procedure used for more complex cases where either the mutual solubility of core and wall materials is limited or difficulty is encountered in finding conditions for phase separation of the core without also precipitating the wall material. For more complex cases, use can be made of a solubility area plot such as described in "A Three Dimensional Approach to Solubility," James D. Crowley et al., Journal of Paint Technology, Vol. 38, No. 496, pp. 269–280 (May, 1966), which is incorporated herein by reference. On a plot with the coordinates of solubility parameter (abscissa) and hydrogen bonding parameter (ordinate), an area is outlined enclosing solvents in which the core and wall materials are soluble. Two dimensional plots can be used for simplicity but possible polarity effects should be borne in mind. The solubility area is determined by titrating a solution of the core and wall materials with a nonsolvent and taking the cloud point as the limit of the solubility area. Use is made of the fact that both parameters can be calculated for the mixture by the equation, shown for solubility parameter only;

$$\sigma_m = X_1\sigma_1 + X_2\sigma_2$$

wherein $X_1$, $\sigma_1$ and $X_2$, $\sigma_2$ are the volume fraction and solubility parameter of solvents 1 and 2, respectively, and $\sigma_m$ is the solubility parameter for the mixture.

Plotting the solubility areas of both wall and core material on the same plot, and assuming no interaction, the initial solution should lie within the overlap of the two areas. Further, as the solvent mixture evaporates, the two parameters should be moved in a direction that will lead to a point within the solubility area of the wall material but outside the area for the core material. This point should be reached while the solution of wall material is still fluid enough to permit formation of a unified core phase if this is desired. In practice, the assumption of no significant interaction between core and wall materials should be checked by making cloud point determinations on mixed solutions. Also the cloud point will change to some extent with core and wall material concentration and therefore concentration limits should be fixed.

Figure 1:
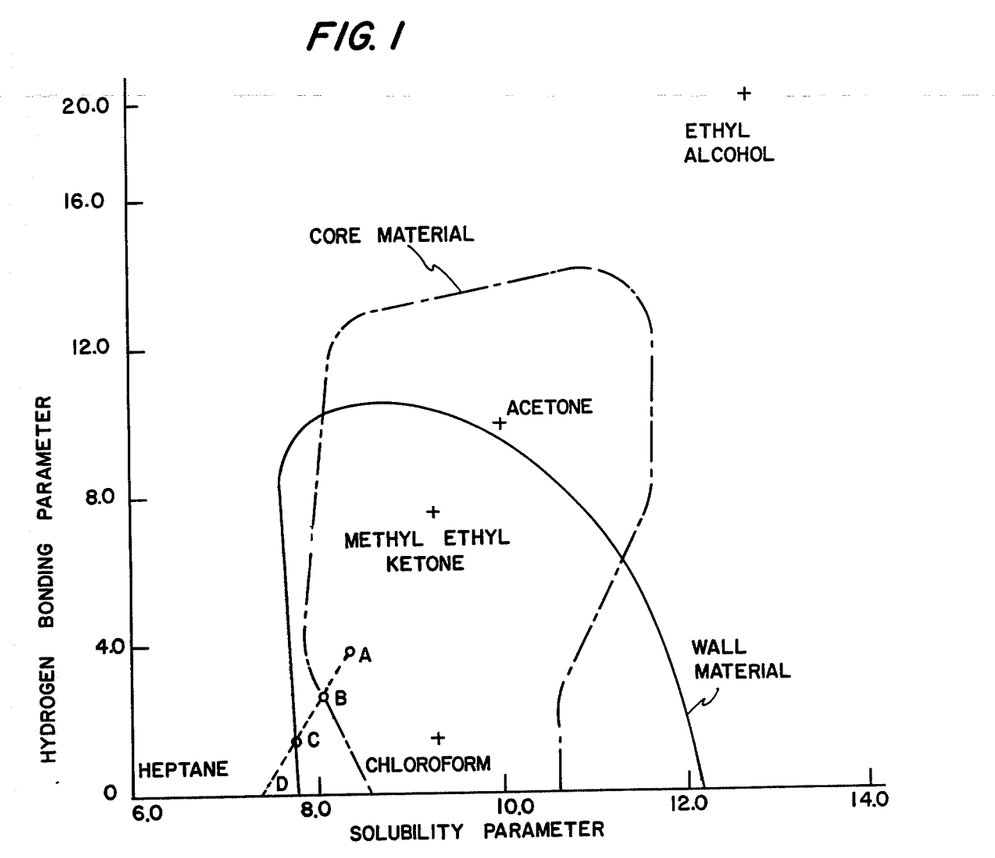
FIG. 1 is a solubility area plot.
Figure 2:
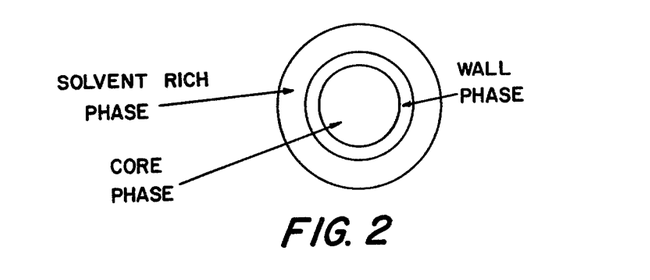
FIG. 2 is a representation of a three-phase capsule-forming system.

An example of a solubility area plot is shown in FIG. 1 with points for some solvents inserted. In FIG. 1, the solvent selected would correspond approximately to point A and could be a 1/1 by volume mixture of methyl ethyl ketone and heptane. Additional experiments would then be made to determine if core and wall materials interaction caused any important changes in solubilities and to determine the properties and composition of the phases formed on evaporation of solvent. With the suggested solvent system and assuming no interaction effects, solvent evaporation would cause the parameters to shift from point A along the dotted line toward point D (pure heptane). At point B, phase separation of the core material would start and, with further evaporation, at point C, the wall material would commence to phase separate and three phases (excluding any solid pigment, etc.) will form as shown in FIG. 2. Additional solvent removal will cause complete phase separation of the wall material, then removal of the solvent phase by evaporation and lastly complete drying and hardening of the capsules.

Although in the example only two materials are present, the procedure can be used for combinations of several materials. With more than one soluble core and wall material, the parameters for the solvent used should lie in a region where all the materials overlap and all of the core materials should start to phase separate before any of the wall materials. Thus, in the example shown, one could have additional core materials with cloud points between points A and B and additional wall materials with cloud points between C and D. In both cases, the materials should be compatible unless a segregated (or layered) core or wall is desired.

The particular solvent employed will, of course, vary depending upon the polymers employed. However, the suitability of a particular solvent for particular core and wall polymers can be readily determined with the main consideration being the solubility of the core and wall materials in such solvent or mixture of solvents and the evaporation characteristics of the solvent or mixture of solvents such as to permit sequential phase separation upon solvent removal. Typical solvents which can be employed are, for example, water, aromatic hydrocarbons such as benzene, chlorobenzene, toluene and the like, cyclic and acyclic aliphatic hydrocarbons such as cyclohexane, pentane, hexane, heptane and the like, halogenated aliphatics such as methylene chloride, ethylene dichloride, dichloromethane, chloroform, carbon tetrachloride, alcohols such as methanol, ethanol, propanol, isopropanol, butanol and the like, methyl ethyl ketone, ethyl acetate, tetrahydrofuran, acetone, dimethylformamide and the like.

In accordance with the present invention, the desired wall material is dissolved in the solvent and the desired core material is dissolved therein. The particular order of addition of core and wall material is of no consequence.

The ratio of core and wall materials to the solvent system generally can be any practical dilution. Thus, the dissolved solids content of the solution may range from about 0.5 percent to about 50.0 percent by weight based on the solution but this can also vary a general limitation being phase separation of the core material and another being practicality of the solute concentration.

The ratio of wall material to core material can be any suitable value and generally is varied with the thickness, strength, porosity, and solubility characteristics of wall desired. Thus, generally, the ratio of wall material to core material may be between about 99 parts by weight of wall material to about 1 part by weight of core material and about 1 part by weight of wall material to about 99 parts by weight of core material. However, the preferred range is between a ratio of about 7 parts by weight of wall material to about 1 part by weight of core material and about 1 part by weight of wall material to about 7 parts by weight of core material as encapsulated particles having the best surface characteristics are obtained. In general, the thickness of the wall material can be controlled by the ratio of the amount of core material to be encapsulated to the amount of wall material. Thus, if a thicker wall layer is desired, more wall material should be used since the ratio of wall to core material remains constant during the process of this invention. In addition, the size of the encapsulated particle also affects the wall thickness since the smaller the particle, the smaller the wall thickness at a constant core to wall ratio.

The solubilities of the core and wall materials that can be employed in the method of this invention can vary considerably in a selected solvent system. For example, completely hydrolyzed styrene-maleic anhydride polymer is about 2.0 percent by weight soluble in water but at least about 20.0 percent by weight soluble in a 50:50 volume mixture of methanol and water. Thus, solutions of the desired core and wall materials can be prepared in relatively dilute or in concentrated form in water alone or by choice of solvent, or mixtures thereof, depending upon the relative solubilities of the materials employed. Further, the concentration of core and wall materials can be increased by the addition of a solubilizing agent, e.g., another hydrophilic liquid such as methanol or ethanol.

Once the solution of core and wall material is prepared or simultaneously with the preparation thereof, a colorant can be admixed therewith if a colored toner particle is desired or other additives, e.g., fumed silica to control viscosity, UV stabilizers, magnetic particles and the like can be added.

The core, wall, or both the core and wall materials can be pigmented or dyed, or pigmented and dyed by addition of suitable pigment or dye or both pigment and dye to the solution of core and wall materials. The pigment or dye, or pigment and dye, in many cases can be concentrated in the core or in the wall material or at the interface between the core and wall material by proper selection of colorant and solution system having the desired surface interaction, and solubility properties. Thus, a dye will generally be concentrated in the phase, core or wall, in which it is soluble. The solubilities obtaining during the encapsulation could conceivably force the dye elsewhere but this would be a special case. For example, a dye soluble in the core material, insoluble in the wall material and soluble in the solvent phase, after phase separation of the wall, would probably be concentrated on the exterior of the capsules. In some cases, dyes will form separate phases like pigment particles because of insufficient solubility in the core and wall materials, that is, where the dye is soluble in the solution but has little or no solubility in either core or wall material after removal of the solvent. In these cases, the solubility of the dye in the core and wall material rich, but still fluid, phases will control where the dye particles are concentrated in the dry capsule.

A pigment will generally be concentrated in the core or wall material which preferentially absorbs on the pigment from solution. With most carbon blacks, and probably most pigments, the tendency to absorb will increase with increased polarity and hydrogen bonding of the polymer. Also the material which is separating as a solvent poor phase is more likely to be absorbed. Thus, in the system employing the polymeric reaction product of isopropylidenediphenoxypropanol and adipic acid as the core material and polystyrene as the wall material with carbon black as the colorant, all three factors favor absorption of the polymeric reaction product of isopropylidenediphenoxypropanol and adipic acid, therefore the carbon black concentrates in the core phase. With polyisobutylene as the core material and poly-(4,4'-dioxydiphenyl-2,2'-propane carbonate) as the wall material, the polyisobutylene has little tendency to be adsorbed even as a solvent poor phase and the carbon black remains suspended in the solution of wall material to be deposited in the capsule wall. Surfactants and stabilizers, including materials added for other reasons such as core plasticizers, can change the adsorption characteristics and therefore result in the pigment being concentrated in a different phase.

Any suitable colorant, whether insoluble pigment or soluble dye, can be dispersed or dissolved in the solvent. If desired, especially for photoelectrophoretic processes, photosensitive colorants can also be employed. Additionally, combinations of pigments and/or dyes can be employed to obtain specific coloration effects.

Suitable pigments for use in the present invention include, for example, carbon blacks, Algol Yellow, Pigment Yellow 6, Benzidine Yellow, Vulcan Fast Yellow GR, Indofast Orange, Ortho Nitroaniline Orange, Vulcan Fast Orange GG, Irgazine Red, Paranitraniline Red, Toluidine Red, Permanent Carmine FB, Permanent Bordeaux FRR, Romanesta Red, Pigment Orange R, Vulcan Fast Rubine BF, Lake Red D, Lithol Red 2G, Double Ponceau R, Calamine Red MB, Pigment Scarlet 3B, Acid Alizarine Red B, Rhodamine 6G, Rhodamine B Lake, Methyl Violet B Lake, Gentian Violet Lake, Quinizarin, Victoria Pure Blue BO Lake, Ethylviolet Lake, Phthalocyanine Blue B Pr, Pigment Blue BCS, Peacock Blue Lake, Brilliant Green B, and the like.

Typical photosensitive organic materials include substituted and unsubstituted organic pigments such as phthalocyanines, for example, copper phthalocyanine, beta form of metal-free-phthalocyanine; tetrachlorophthalocyanine; and x-form of metal-free phthalocyanine; quinacridones, as, for example, 2,9-dimethyl quinacridone; 4,11-dimethyl quinacridone; 3,10-dichloro-6,13-dihydroquinacridone; 2,9-dimethoxy-6,13-dihydroquinacridone and 2,4,9,11-tetrachloroquinacridone; anthraquinones such as 1,5-bis-(beta-phenylethylamino)anthraquinone; 1,5-bis-(3'-methoxypropylamino)anthraquinone; 1,2,5,6-di-(C,C'-diphenyl)-thiazole-anthraquinone; 4-(2'-hydroxyphenylmethoxyamino)anthraquinonyl-amino-6-(1"-pyrenyl)-triazine; 2,4,6-tri-(1', 1", 1'"-pyrenyl)-triazine; azo compounds such as 2,4,6-tris(N-ethyl-p-aminophenylazo)phloroglucinol; 1,3,5,7-tetrahydroxy-2,4,6,8-tetra(N-methyl-N-hydroxyethyl-p-amino-phenylazo)-naphthalene; 1,3,5-trihydroxy-2,4,6-tri(3'-nitro-N-methyl-N-hydroxy-methyl-4'-aminophenylazo)benzene;

metal salts and lakes of azo dyes such as calcium lake of 6-bromo-1-(1'-sulfo-2-naphthyl-azo)-2-naphthol; calcium lake of 1-(2'-azonaphthalene-1'-sulfonic acid)-2-naphthol; calcium lake of 1-(4'-ethyl-5'-chloroazobenzene-2'-sulfonic acid)-2-hydroxy-3-naphthoic acid; and mixtures thereof. Other organic pigments include polyvinylcarbazole; trisodium salt of 2-carboxyl phenylazo (2-naphthiol-3,6-disulfonic acid; N-isopropyl-carbazole; 3-benzylidene aminocarbazole; 3-aminocarbazole; 1-(4'-methyl-5'-chloro-2'-sulfonic acid)azobenzene-2-hydroxy-3-naphthoic acid; N-2"pyridyl-8,13-dioxodinaphtho-(2,1-b; 2', 3'-d)-furan-6-carboxamide; 2-amino-5-chloro-p-toluene sulfonic acid and the like.

The x-form of metal free phthalocyanine is preferred because of its excellent photosensitivity and intense coloration.

Typical inorganic photosensitive compositions include cadmium sulfide, cadmium selenide, cadmium sulfo-selenide, zinc oxide, zinc sulfide, sulfur, selenium, antimony sulfide, lead oxide, lead sulfide, arsenic sulfide, arsenic-selenium, and mixtures thereof.

Any suitable dye or class of dyes may be used. Typical acid dyes include, for example, anthraquinones such as C.I. Acid Blue 127, triphenylmethanes such as C.I. Acid Blue 103, azine dyes such as C.I. Acid Blue 98, xanthenes such as C.I. Acid Violet 9, C.I. Acid Red 92 and the like, nitroso dyes such as C.I. Acid Green 1, monoazo dyes such as C.I. Acid Yellow 29, diazo dyes such as C.I. Acid Green 20, quinolines such as C.I. Acid Yellow 3, diazo dyes such as C.I. Acid Orange 79, and the like.

Typical basic dyes include thiazoles such as C.I. Basic Yellow 1, ketone imine dyes such as C.I. Basic Yellow 2, acridines such as C.I. Basic Yellow 4 and the like.

Typical dispersed dyes include nitro-acetamine dyes such as Yellow 2 RZ-C.I. Disperse Yellow 1, azo dyes such as C.I. Disperse Orange 3, Disperse Red 1, C.I. Disperse Black 9, C.I. Blacks 18, 19, 16, 1, 7, 12, 24 and 27, anthraquinones such as C.I. Disperse Violet Celanthrene Red, C.I. Disperse Blue 9, diazo dyes such as C.I. Food Black 1 and amino ketone dyes such as C.I. Disperse Green 1.

The wall and core materials as well as the colorant can be dissolved in the solvent, or the colorant can be dispersed in the solvent, by admixing said materials with the solvent under intensive agitation as obtained, for example, in a high speed, high shear mixer such as a Waring blender equipped with a Polytron high shear head, a homogenizing mixer or the like, capable of a speed of from about 1000 to 15,000 rpm.

The amount of colorant added can range from about 3 to about 20 weight percent based on the total weight of the colored toner. If the toner colorant is a dye substantially smaller quantities of colorant can be used. Preferably, prior to dispersion of the colorant in the solvent, dispersing aids can be added to the solvent such as surfactants, dispersants and the like to assist in effecting a uniform dispersion. It has been found that increasing the viscosity of the solution prior to addition of the colorant is an effective means of stabilizing the colorant dispersion. Typical oil soluble surfactants which can be employed to aid the dispersion of colorant are, for example, bis(trialkyl) esters of sodium sulfosuccinic acid, nonyl phenyl polyethoxy ethanol, alkylated polyvinyl pyrrolidone, phosphate monoglyceride, alkanolamides, sorbitol esters and the like. Generally, sufficient surfactant is from about 0.1 to about 50 weight percent of the colorant.

Once the colorant dispersion in the wall-core solution, is obtained it, in turn, is admixed with an immiscible liquid to form a dispersion wherein said colorant dispersion is the dispersed phase and the immiscible liquid is the continuous phase. Generally, this is most conveniently accomplished by emulsifying said colorant dispersion (hereinafter called the "organic phase") in water. If desired, the stability of the emulsion can be enhanced by employing an immiscible liquid containing a suspending agent. Thus, when water is employed, the aqueous phase can be prepared by dissolving a suspending agent in water with continuous agitation. Suitable water soluble suspending agents are, for example, water soluble polymers such as poly(vinyl alcohol), poly(ethylene oxide), polyvinyl pyrrolidone, polyglycols and the like. Generally, from about 1 to about 10 weight percent suspending agent based on the weight of water has been found sufficient to effect a stable dispersion of the organic phase when said phase is admixed with the aqueous phase. Above about 10 weight percent, the resulting viscosity of the aqueous phase would be too high to enable the obtainment of the desired particle size. Preferably, 1 to about 4 weight percent suspending agent is employed.

After preparation of the aqueous phase, the aqueous phase can be charged to a reaction vessel and stirred at high speeds of from about 1000 to about 15,000 rpm, while the organic phase is added thereto. Under these conditions, the organic phase is rapidly and uniformly dispersed within the aqueous phase as a plurality of particles having an average particle size ranging from 1 to about 100 microns. Generally, the organic phase should comprise from about 1 to about 70 percent of the total (combined) volume, and preferably ranges from about 2 to about 40 percent of the total volume.

Once a stable dispersion or emulsion is formed, sequential phase separation of the core and wall materials, respectively, can be effected by vaporization of the solvent either by heat or vacuum, by cooling or by addition of a non-solvent for the core and wall materials as described hereinabove.

Vaporization of the solvent can be effected by heating the emulsion with an aqueous continuous phase, at temperatures of from about 40° C. to about 95° C. depending upon the particular solvent employed. Continuous agitation of the emulsion is maintained during heating. Alternatively, aspirator vacuum or sparging with an inert gas can be employed to remove the solvent. As the solvent is removed and the concentration of the core and wall material in the residual solvent increases, the core phase separates followed by phase separation of a coherent film of wall material, thereby encapsulating the core together with the dispersed colorant. The resulting microcapsules are obtained as an aqueous slurry which can be recovered by filtration and drying. Since phase separation and hardening occurs within the discrete and separated globules of the organic phase, agglomeration is avoided. Also, since the emulsion is formed under controlled conditions, substantially uniform particle size is obtained.

In an alternate embodiment of the present invention, the solution of wall and core material can be prepared at elevated temperatures. Emulsification thereof can also be effected at elevated temperatures. Upon attaining a stable emulsion, the temperature can be lowered effecting sequential phase separation of the core and wall.

In still another embodiment, a non-solvent for the core and/or wall material can be admixed with the stable emulsion. The non-solvent must be miscible with the organic phase and actually becomes part of said organic phase thereby altering the solubility characteristics of the solvent and effecting sequential phase separation of the core and wall materials.

In yet another embodiment, an emulsion is formed with an immiscible liquid, e.g., water, as described above and then the immiscible liquid is frozen, thereby stabilizing the emulsion by forming a solid wall around each droplet of the organic phase. By freeze drying the frozen emulsion in conventional freeze drying equipment, the solvent is caused to evaporate effecting phase separation of the core and wall materials. As the solvent evaporates, the microcapsule wall hardens and agglomeration is prevented by the frozen continuous phase. When the continuous phase has been completely sublimed, the capsules remain as a dry powder. Employing this technique, recovery problems are completely avoided.

Employing the processes of the present invention, uniform spherical toner particles containing a colorant which can be photosensitive can be readily obtained. Advantageously, the particles can be surface hardened by proper selection of the wall material enabling the use of low melting resins which are desirable for rapid fusing operations.

The encapsulated toner compositions obtained in accordance with the present invention can be admixed with solid or nonsolvent liquid vehicles therefor to form electrostatographic developer compositions. In general, successful results have been obtained with from about 10 to about 200 parts by weight of either solid or liquid vehicle to about 1 part by weight of toner. Preferably, the vehicle to toner ratio ranges from about 50 to 1 to about 150 to 1. In such preferred compositions the vehicle acts effectively to remove any toner particles which might tend to adhere to a non-image area and the toner itself forms dense readily transferable and fusible image.

Solid vehicles are generally in the form of granular carrier particles which are larger than the toner particles and are shaped to roll across the image-bearing surface. Generally speaking, the carrier particles should be of sufficient size so that their gravitation or momentum force is greater than the force of attraction of the toner in the charged areas where the toner is retained on the plate in order that the granular carrier particles will not be retained by the toner particles, while, at the same time, the toner particles are attracted and held, or repelled, as the case may be, by the charged or uncharged areas of the plate since said toner particles acquire a charge of opposite polarity to the charge of both the granular carrier particles and the plate. It has been found best to use granular carrier particles of a size larger than about 10 microns, usually between 30 and about 1,000 microns, and toner particles of a size from about 1 to 20 microns. The granular carrier particles may, if desired, be somewhat larger or smaller as long as the proper size relationship to the electroscopic toner is maintained so that the granular carrier particles will flow easily over the image surface by gravity when the plate is inclined without requiring additional means or measures to remove them.

Typical carrier materials include: sodium chloride, ammonium chloride, potassium chlorate, granular zircon, granular silicon, methylmethacrylate, glass, silicon dioxide, flintshot, iron, steel, ferrite, nickel, carborundum, and mixtures thereof. Many of the foregoing and other typical carriers are described by L. E. Walkup et al, in U.S. Pat. No. 2,638,416 and E. M. Wise in U.S. Pat. No. 2,618,552.

When it is desired to employ a liquid developer composition, the toner compositions of the present invention can be incorporated in any conventional liquid vehicle which is a non-solvent for and non-reactive with the polymer and which has a volume resistivity above about $10^{10}$ ohm-cm and a dielectric constant greater than 2.5. In addition, the liquid vehicle should, if possible, be one which does not have an appreciable toxicity and which is not too flammable. It is also considered desirable to employ a liquid which is neither malodorous nor highly colored. It is essential that the liquid vehicle be inert to the material which bears the latent electrostatic image to be developed. Suitable liquid carriers are, for example, kerosene, turpentine, benzene, cyclohexane, carbon tetrachloride, silicones, fluorinated hydrocarbons such as tetrachlorodifluoroethane, trichlorotrifluoroethane and the like. Other suitable liquid vehicles are described in U.S. Pat. No. 2,899,335.

In another aspect of the present invention, an electrostatographic process is provided which employs the developer compositions of this invention. The toner develops the latent electrostatic-image on the image bearing surface and can be fused thereon or can be subsequently electrostatically transferred to a substrate and then fused on the substrate to form a permanent image thereon.

The process of the present invention is particularly advantageous for preparing solid coated toner material which is in an extremely fine state of subdivision, for example, from about 0.5 to about 35 microns in diameter. The particular particle size is not critical to the process of the invention, but is determined by the use to which the coated particle is to be employed. For example, a micronized powder or finely dispersed liquid on the order of about 0.5 to about 10 micron size is desirable for vitamins and other food supplements, for substances to be incorporated into cosmetic formulations and for insecticides. A powdered material up to about 200 micron size is a desirable size for rodenticides.

The encapsulated products of the present invention also find applications due to their unique properties in the formulation of compositions for wisely diversified fields of use. In the cosmetic field, products such as soap bars, lotions and creams can be formulated containing encapsulated water soluble ingredients which would be unstable or incompatible in unencapsulated form in the presence of other ingredients of the particular formulation. For example, since certain antibacterials such as the chlorinated phenols and neomycin sulfate are incompatible on prolonged contact with soap, the present invention makes possible the formulation of a soap bar containing both of these ingredients.

In the agricultural field, encapsulated food supplements and medicaments can be advantageously formulated. For example, water soluble fertilizers such as ammonium nitrate, urea and superphosphate can be encapsulated for application to the soil when a slow release or extended action is desirable, e.g., where rapid release would "burn" the vegetation. For the control of pests, encapsulated insecticides can be deposited on vegetation or in the soil without harm to the vegetation; moreover, the insecticide is not dissolved and washed away by moisture or rain, thereby allowing the insecticide to remain where deposited until ingested by the insect. Antihelminthic agents such as piperazine phosphate or citrate, and methyl rosaniline chloride when encapsulated can be incorporated into feed material for domestic animals, the encapsulated antihelminthic thereby being tasteless in the feed and also protected from decomposition during storage of the feed. Rodenticides such as calcium cyanide, thallium sulfate and sodium fluoroacetate, which are unstable in the presence of moisture or have an odor or taste repellent to the rodent are advantageously encapsulated.

Vitamins, minerals, amino acids and other food supplements, when encapsulated can be incorporated an animal feeds and be protected from decomposition during storage periods from such adverse conditions as air, moisture, and incompatible ingredients in the feed composition itself. In a similar manner, food supplements can be incorporated in compositions for human use.

The present invention finds application in medical treatment of both animals and humans. Medicaments can be encapsulated by the method of the present invention to give a sustained release upon ingestion with resultant sustained therapeutic action. Coatings which will not dissolve in the stomach can be formulated to overcome the problem of gastric irritation or nausea caused by such medicaments as emetine hydrochloride, quinacrine hydrochloride and para-aminosalicylic acid. Similarly, medicaments such as penicillin and certain glandular extracts which are inactivated by the acid condition or enzymes encountered in the stomach are advantageously encapsulated.

The following examples further define, describe and compare methods of preparing the encapsulated materials of the present invention and of utilizing them as toner compositions and in developer compositions to develop electrostatic latent images. Parts and percentages are by weight unless otherwise indicated.

The following examples illustrate that forming an emulsion of the solution of core and wall material in water or another liquid incompletely miscible with the solution provides a means of preventing agglomeration of the core material before phase separation of the wall material and agglomeration of the wall material after or during its phase separation.

EXAMPLE 1

4 Grams of a 70/30 copolymer of docosyl acrylate and styrene are admixed with 0.4 grams of carbon black in 70 milliliters of chloroform and the resulting mixture is heated to reflux whereupon the polymer completely dissolves. Thereupon 4.0 grams of a 75/25 copolymer of styrene and n-butyl methacrylate are added to the mixture with continuous stirring and heating under reflux conditions for 20 minutes. Thereafter, the chloroform that had evaporated in the interim is replaced resulting in 95 milliliters of a mixture comprising a solution of the two copolymers in chloroform and the carbon black dispersed throughout the solution. 2 Grams of polyvinyl alcohol are dissolved in 400 milliliters of distilled water in a Waring blender. Thereafter, the aqueous solution of polyvinyl alcohol is added to the polymer-carbon black mixture which is maintained at about 50° C. under continuous agitation provided by a magnetic bar stirrer in a 1,000 milliliter beaker. Under these conditions the polymer-carbon black mixture emulsifies rapidly. The resulting emulsion is placed on a hot plate and heated at temperatures ranging from 33° C. to 80° C. until no chloroform odor can be detected. The beaker is then removed from the hot plate and cooled to 22° C. by addition of ice. The resulting aqueous slurry of black spherical particles is filtered to recover the black particles and washed several times by stirring said particles in 200 milliliters of water. Three aqueous washes are heated to 45° C. to aid in dissolving any residual polyvinyl alcohol. Thereafter, the black particles are recovered by filtration and allowed to dry at room temperature resulting in 5.36 grams of capsules comprising a core of docosyl acrylate/styrene copolymer encapsulated in a wall of styrene/n-butyl methacrylate copolymer, both the core and the wall being colored by the presence of carbon black dispersed therein. The capsules range in size from about 2 to about 12 microns. The capsules exhibit a stick point on a Kofler Hot Bench of about 68° C. As used herein and in the following examples, the term "stick point" means the temperature at which a material adheres to a metallic substrate; for example, a continuous line of sample is equilibrated on a Kofler Hot Bench for about two hours and then gently brushed away. The "stick point" is the lowest temperature at which the sample "sticks" to the metallic plate of the hot bench.

EXAMPLE 2

5 Grams of polyvinyl acetate are dissolved in 50 milliliters of acetone. One gram of carbon black is added to the polymer solution and dispersed therein. Thereafter 5 grams of polystyrene are dissolved in a mixed solvent comprising 40 milliliters of chloroform and 60 milliliters of n-hexane. This solution is admixed with the polyvinyl acetate solution containing carbon black dispersed therein and the resulting mixture is added to 300 milliliters of distilled water containing 2 grams of polyvinyl alcohol dissolved therein contained in a Waring blender. Under rapid agitation, an emulsion is readily obtained. The solvents are removed from the emulsion under aspirator vacuum. A slurry of black particles in water is obtained and the slurry is filtered to obtain a dye cake of black particles on the filter. The filter cake is placed in a Waring blender and washed several times with a total of 800 milliliters of water. Thereafter, the black particles are recovered by filtration and allowed to dry at room temperature. There results 7.50 grams of very black particles comprising a core of polyvinyl acetate encapsulated with a wall of polystyrene. The carbon black appears to pigment both the core and wall. The resulting encapsulated particles are very black and hard and are not tacky on a Kofler Hot Bench at 100° C.

EXAMPLE 3

5.5 Grams of n-butyl methacrylate and 5.5 grams of polystyrene are dissolved in 50 milliliters of chloroform. Thereafter, 1 gram of carbon black is dispersed in the polymer solution. The resulting mixture of polymer and carbon black is added to a solution of 1.0 gram of polyvinyl alcohol in water in a Waring blender. An emulsion is readily obtained. The resulting emulsion is placed in a filter flask and the chloroform is evaporated under aspirator vacuum over a period of 1½ hours. The resulting slurry of black particles in water is filtered and washed with water and then dried at room temperature. The filtered solids are in no way agglomerated. The black particles comprising a core of n-butyl methacrylate encapsulated in a wall of polystyrene pigmented in both the core and wall with carbon black exhibits a stick point on a Kofler Hot Bench of 95° C.

EXAMPLE 4

This example illustrates the preparation of encapsulated pigmented particles by forming an emulsion and stabilizing the emulsion by freezing it. Thereafter the solvent is removed by conventional freeze drying techniques effecting sequential phase separation and formation of an encapsulated product.

One gram of poly-n-butyl methacrylate is dissolved in 10 milliliters of chloroform. Simultaneously, one gram of polystyrene is dissolved in 10 milliliters of chloroform and the resulting polymer solutions are admixed with each other. Thereafter, 0.2 gram of carbon black is dispersed in the solution with magnetic stirring. The solution is then emulsified in 50 milliliters of water on a Waring blender. The resulting emulsion is then cooled to dry ice temperatures and is freeze dried at about 0.1 millimeters mercury in conventional freeze drying equipment.

A fine, black powder is recovered from the freeze drying flask. This material exhibits a stick point of about 100° C. The encapsulated particles comprise a core of poly-n-butyl methacrylate encapsulated in a wall of polystyrene. The carbon black appears to pigment both the core and the wall.

Although specific materials and conditions are set forth in the above exemplary processes in making the encapsulated particles of this invention, these are merely intended as illustrations of the present invention. Various other polymers, solvents and conditions such as those listed above may be substituted in the examples with similar results.

Other modifications of the present invention will occur to those skilled in the art upon a reading of the present disclosure. These are intended to be included within the scope of this invention.

What is claimed is:
1. Process for forming capsules comprising
    (i) forming a solution of wall material and core material in a solvent;
    (ii) admixing said solution with an immiscible liquid to form a dispersion wherein said solution is the dispersed phase and the immiscible liquid is the continuous phase;
    (iii) altering the solubility characteristics of the solvent for said solution to effect sequential phase separation of said core and wall materials, respectively, thereby forming capsules of core material encapsulated with wall materials; and
    (iv) recovering said capsules.
2. Process for forming capsules as defined in claim 1 wherein a colorant or additive is admixed with said solution of wall and core material in a solvent.
3. Process for forming capsules as defined in claim 1 wherein the wall material is a material exhibiting a blocking temperature of at least about 100° F.
4. Process for forming capsules as defined in claim 1 wherein the wall material is a styrene resin.
5. Process for forming capsules as defined in claim 1 wherein the solubility characteristics of the solvent for the core and wall materials is altered by progressively removing solvent from the dispersed phase of the dispersion.
6. Process for forming capsules as defined in claim 1 wherein the solubility characteristics of the solvent for the core and wall materials is altered by progressively adding a non-solvent for both the core and wall materials to the dispersed phase of the dispersion.
7. Process for forming capsules as defined in claim 1 wherein the dispersion is frozen and the solubility characteristics of the solvent for the core and wall materials is altered by freeze drying the dispersion.
8. Process for forming capsules as defined in claim 1 wherein the solubility characteristics of the solvent for the core and wall material is altered by adding a non-solvent for the core and wall material which is less volatile than the solvent and miscible therewith, and vaporizing the solvent thereby concentrating the non-solvent and effecting sequential phase separation of the core and wall materials.
9. Process for forming capsules as defined in claim 1 wherein the combined concentrations of core and wall materials in the solvent ranges from about 0.5% to about 50% by weight based on the total weight of solution.
10. Process for forming capsules as defined in claim 1 wherein the ratio of wall material to core material in the solvent ranges from between about 99 parts by weight of wall material to about 1 part by weight of core material to about 1 part by weight of wall material to about 99 parts by weight of core material.
11. Process for forming capsules as defined in claim 2 wherein the added colorant can range from about 3 to about 20 weight percent of the total weight of the colored capsule.
12. Process for forming capsules as defined in claim 2 wherein a dispersing aid is added to the solvent in amounts ranging from about 0.1 to about 50 weight percent of the colorant to assist in effecting a uniform dispersion of the colorant.
13. Process for forming capsules as defined in claim 1 wherein the immiscible liquid is water.
14. Process for forming capsules as defined in claim 1 wherein a suspending agent is admixed with the immiscible liquid.
15. Process for forming capsules as defined in claim 14 wherein the suspending agent is added in amounts of from about 1 to about 10 weight percent based on the weight of immiscible liquid.
16. Process for forming capsules as defined in claim 1 wherein the solution of core and wall material is admixed with the immiscible liquid at high speeds of from about 1,000 to about 15,000 rpm.
17. Process for forming capsules as defined in claim 1 wherein the dispersed phase comprises from about 2 to about 40 percent of the total volume of the dispersion.
18. Process for forming capsules as defined in claim 1 wherein the capsule exhibits an average particle size ranging from 1 to about 100 microns.

* * * * *